April 17, 1951     L. L. RYDEN     2,548,909
METHOD OF PRODUCING LAMELLAR POLYSTYRENE PARTICLES
Filed Feb. 9, 1948
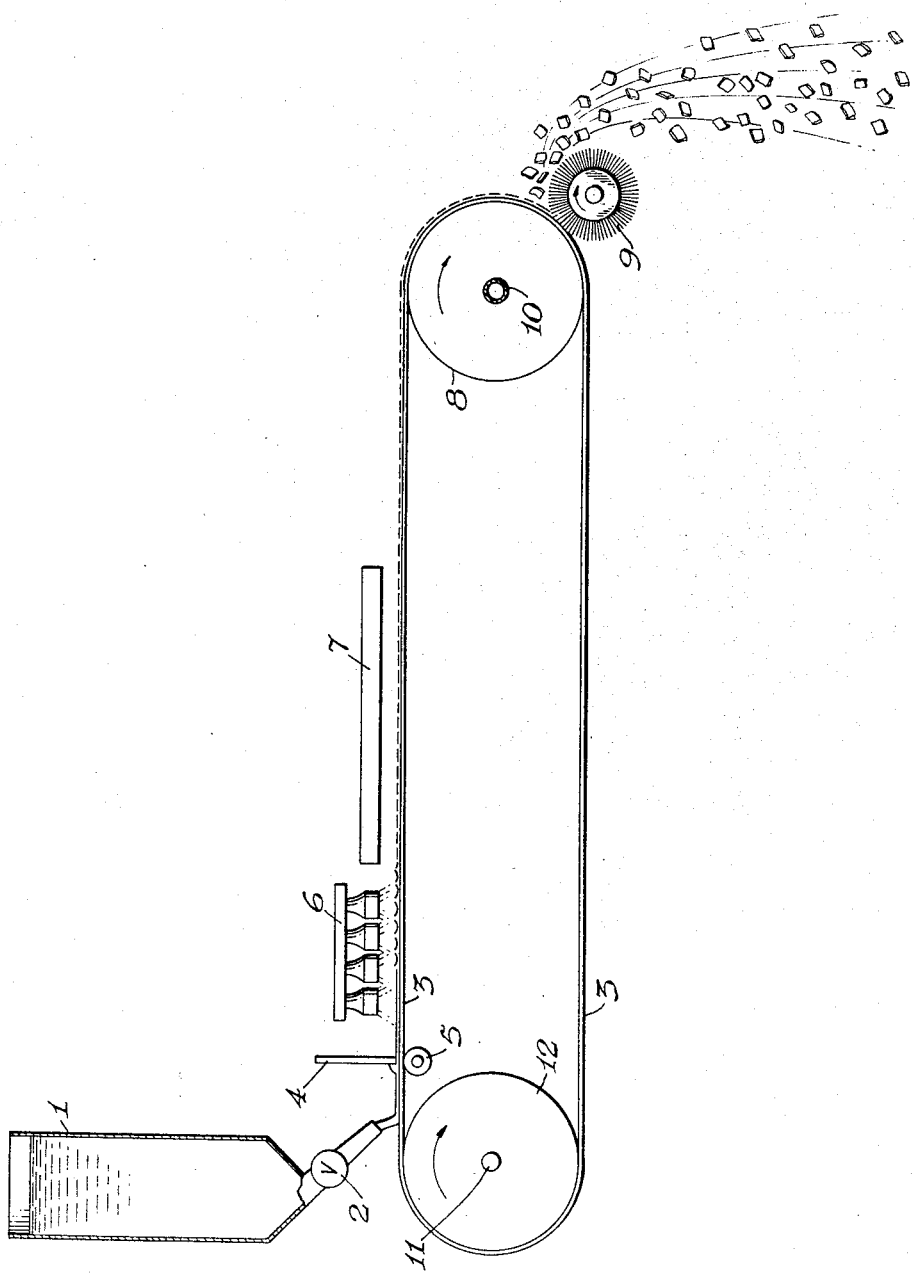
INVENTOR.
Laurence L. Ryden
BY
Griswold & Burdick
ATTORNEYS Patented Apr. 17, 1951

2,548,909

UNITED STATES PATENT OFFICE 2,548,909

METHOD OF PRODUCING LAMELLAR POLYSTYRENE PARTICLES

Laurence L. Ryden, Midland, Mich., assignor to The Dow Chemical Company, Midland, Mich., a corporation of Delaware Application February 9, 1948, Serial No. 7,215

10 Claims. (Cl. 18—47.5)

This invention concerns an improved method for making lamellar particles comprising polystyrene and relates to such products in the form of thin chips or flitters. It pertains especially to a process for production of thin lamellar particles of resinous polymers and copolymers derived from styrene from aqueous emulsions containing such products.

Methods heretofore employed for the production of lamellar particles or thin flakes of polystyrene and pigmented polystyrene involve operations of milling the thermoplastic polymer at high temperature to form a plastic mass, calendering the heat plastified mass to a thin sheet, removing the thin sheet of plastic from the rolls, cooling, and thereafter grinding the plastic sheet to form thin flakes. Such methods, generally, are unsatisfactory since they are expensive, require the use of heavy machinery and involve difficult operations of calendering the polymer to a thin film, i. e. of the order of 2 to 3 mils thick, and removing it from the rolls as a free film.

It is a primary object of this invention to provide an efficient and inexpensive method of making polystyrene flitters in the form of thin lamellar particles from an aqueous colloidal polystyrene solution obtained by polymerizing styrene in aqueous emulsion. Another object is to provide an effectual method of making pigmented lamellar particles of the thermoplastic copolymers comprising essentially styrene from aqueous colloidal solutions obtained by copolymerizing mixtures consisting of predominately styrene with minor proportions of other polymerizable compounds in aqueous emulsions. A further object is to produce lamellar particles from aqueous compositions comprising aqueous colloidal solutions of synthetic thermoplastic resins consisting essentially of styrene in polymer and/or copolymer form, which dry in thin layers to provide a residue consisting of individual powdery flakes that retain their identity. A layer of the powdery flakes may be fused by heating to form a body of individual lamellar particles. Other and related objects will become apparent as the description of the invention proceeds.

I have found that an aqueous colloidal polystyrene solution can be dried in a thin layer to a residue consisting of individual powdery flakes that retain their identity and are composed essentially of polystyrene particles. By heating the dry flakes to a temperature sufficient to fuse the polystyrene particles in the individual flakes the powdery flakes are converted to relatively strong lamellar particles.

I have further found that pigmented lamellar particles of polystyrene and the thermoplastic copolymers of styrene with minor proportions of other polymerizable vinylidene compounds can be made from aqueous emulsions by dispersing a pigment in an emulsion, spreading a layer of the pigmented emulsion on a plate or on a metal surface, drying the aqueous layer to provide individual powdery flakes, heating the powdery flakes to a temperature sufficient to fuse the thermoplastic resinous particles in the powdery flakes, cooling the fused particles and thereafter removing the particles from the plate or metal surface. The term "vinylidene" is herein employed to mean compounds containing the $CH_2=C<$ group.

Lamellar particles having any desired thickness from about 2 mils and greater may be made by varying the body, or thickness, of the aqueous layer that is to be dried. Layers of the aqueous compositions that dry to form flakes less than 2 mils in thickness usually form particles that are fragile and are difficult to remove from the drying surface.

The accompanying drawing is a diagrammatic sketch of a side elevation illustrating an arrangement of apparatus suitable for practice of the invention.

Reservoir 1 holds a supply of the aqueous composition. Valve 2 regulates flow of the composition onto the endless metal belt 3. A spreader bar or doctor blade 4 spreads the aqueous composition in a uniform layer on the moving belt. Roller 5 provides support for the belt below the spreader bar. A bank of infra-red lamps 6 provides heat to dry the aqueous layer to powdery flakes. Heater 7 preferably comprises a bank of electrical heating elements, with suitable reflectors to project the heat downward onto the powdery flakes on the belt. The powdery flakes are fused by the radiant heat and are thereafter cooled by passing the belt over the water cooled hollow drum 8 and are removed from the belt by usual means, e. g. the rotating brush 9. Water is circulated through hollow drum 8 by way of openings in the hollow shafts 10. The shaft 11 of drum 12 driving the endless belt 3 is preferably actuated by an electric motor operating through a readily adjustable variable speed gear assembly, not shown, to obtain greater flexibility of operation.

For purposes of simplification the invention is hereinafter more fully described in terms of an aqueous colloidal polystyrene solution although it is to be understood that other aqueous emulsions or mixtures of emulsions wherein styrene, in polymerized or copolymerized form, constitutes at least 85 per cent by weight of the thermoplastic synthetic resinous material, are equally applicable in practice of the invention. It is necessary that the synthetic resinous material be thermoplastic and that thin layers of the aqueous emulsion or dispersion of emulsion and pigment may be dried to produce small flakes which retain their identity. Aqueous emulsions of thermoplastic synthetic resins which dry to form continuous films are not adapted to use in the process.

According to the invention an aqueous colloidal polystyrene solution, prepared for example by polymerizing styrene in aqueous emulsion, is blended with an aqueous dispersion of a water-soluble hydrophilic thickening or dispersing agent such as methylcellulose, sodium cellulose glycolate, Cellosize WS (hydroxyethylcellulose), algin, casein or the like, and the aqueous composition is spread as a thin layer on a flat plate or metal surface.

Thermoplastic polymers and copolymers which I have found may be employed in aqueous colloidal solutions to produce thin flakes by the method of this invention include polystyrene and copolymers of styrene with other vinylidene compounds such as chlorostyrene, methylstyrene, ethylstyrene, dichlorostyrene, alpha-methylstyrene, butadiene, vinyl chloride, etc., wherein the styrene is present in amounts corresponding to at least 85 per cent by weight of the combined synthetic resinous material.

Blends of aqueous colloidal solutions may also be employed to provide an aqueous emulsion containing styrene in polymer and copolymer form in amounts corresponding to 85 per cent or more of the combined thermoplastic resinous material, e. g. an aqueous colloidal polystyrene solution may be blended with a synthetic latex containing a copolymer of 60 per cent styrene and 40 per cent butadiene to form a mixed aqueous emulsion wherein styrene constitutes 85 per cent or more of the thermoplastic resinous material.

Aqueous colloidal solutions of the polymers and copolymers may be prepared in known manner by polymerizing styrene alone or in admixture with the above-named monomeric compounds in the presence of water containing an emulsifying agent and a peroxygen catalyst, e. g. hydrogen peroxide, benzoyl peroxide, potassium persulphate, etc.

It is preferred to employ aqueous emulsions containing a high concentration of the thermoplastic resinous material, i. e. 35 per cent by weight or more, in practice of the invention, although emulsions having a solids content as low as 10 per cent may be used, if desired.

Pigments, dyes, coloring agents, etc., may be incorporated with the aqueous emulsion, if desired. When employed, pigments are incorporated with the aqueous emulsion preferably by first wetting the pigment with an aqueous solution of a water-soluble hydrophilic dispersing agent, e. g. methylcellulose, and thereafter gradually blending the emulsion with the pigment dispersion. Emulsifying agents are added to the aqueous dispersion of pigment and hydrophilic compound to aid in blending the emulsion with the pigment. Pastes of pigments may be advantageously employed in making the pigment dispersions, since in most instances they are readily dispersed in the aqueous medium without forming agglomerates of the pigment particles.

The water-soluble hydrophilic compounds also serve as thickening agents for the aqueous emulsion and are usually employed in amounts corresponding to from 0.02 to 10 per cent by weight of the emulsion used. They are added to the pigment, or to the emulsion as aqueous solutions, usually of rather low concentration, i. e. from 1 to 10 per cent, since higher concentrations tend to form gels which are difficult to disperse in the emulsion. Compounds which may be employed as thickening agents, or protective colloids, include: methylcellulose, sodium cellulose glycolate, Cellosize WS (hydroxyethylcellulose), algin, casein or the like.

The aqueous emulsion is usually thickened to a consistency such that it does not readily flow when spread as a thin layer on a flat surface, thus allowing the composition to be deposited as a uniform layer on a belt or plate. The layer can thereafter be dried and fused to form polymer laminae of substantially uniform thickness.

When thickening an aqueous emulsion by adding small proportions of the just-described hydrophilic compounds thereto, the consistency of the composition can most readily be determined by dipping a paddle into the mixture and allowing the excess liquid to drain therefrom. A more accurate determination of the flowability of the thickened composition can be made by determining the viscosity, e. g. by means of a torsion viscosimeter.

Small amounts of lubricants such as butyl stearate, paraffin, soyabean oil, corn oil, or the like may be added to the aqueous composition, preferably as aqueous emulsions, to minimize sticking of the fused particles to the surface, e. g. of a metal belt, on which they are formed, but the addition of such compounds is not necessary in practice of the invention. When used, a preferred amount of the lubricant is from 1 to 10 parts per 100 parts of the thermoplastic resinous material.

The aqueous composition is spread onto a flat plate or a metal belt preferably by means of a spreader bar or doctor blade in a layer having a uniform thickness so as to form on drying and fusing lamellar particles of equal or substantially equal thickness. When making lamellar particles having a thickness of 2 to 3 mils, the aqueous composition is usually applied to the surface of the belt in a layer of from 4 to 10 mils deep. When making chips suitable for use as molding granules the aqueous composition may be spread as a layer of greater thickness, i. e. 10 to 120 mils or thicker, to form fused lamellar particles having a thickness of from 3 to 70 mils or more. The thickness of the layer of the aqueous composition is usually determined by the thickness desired in the lamellar product. For most purposes a layer of the aqueous composition of from 4 to 10 mils in depth is satisfactory to produce thin flitters suitable as surface coatings, e. g. on paper, while layers 20 to 120 mils thick produce chips suitable for use as molding granules. Thicker coatings of the aqueous compositions may be employed, if desired, but are more difficult to dry and fuse to form non-friable particles.

The aqueous layer is dried, at below the fusion temperature of the polymer, e. g. by heating in a warm air current, or under infra-red lamps, or in other conventional manner, to provide a residue consisting of individual thin powdery flakes.

Drying of the layer of aqueous emulsion is preferably accomplished by employing a bank of infra-red lamps supported above a metal belt and mounted so that they are movable on the supports in a vertical direction in order that the distance between the lamps and the aqueous layer can easily be changed.

The powdery flakes are heated, without removing from the surface, to a temperature sufficient to cause the individual particles of the flakes to coalesce and form non-friable flakes, and preferably to a temperature sufficient to fuse completely the powdery flakes and form lamellar particles. The latter are usually of from 7 to 100 mils width or diameter, but they may be obtained in smaller or larger sizes.

At temperatures near or slightly above the melting point of polystyrene, i. e. from 170° to 200° C., heating for only a few seconds is required to fuse the dry powdery flakes to form integral small lamellar particles. External heating at a fusion temperature is preferably discontinued promptly, e. g. within 10 seconds, after completing the fusion, and the fused particles cooled to below the second order transition temperature as determined by the method of Boyer et al., J. Applied Phys. V. 15, p. 398, 1944. Heating of the dried flakes for several hours or longer at temperatures between the fusion and the second order transition temperatures of the polymer will cause the flakes of polymer to shrink and form firm granules which are suitable for many uses, e. g. molding granules.

Fusing of the dry flakes is preferably carried out by supporting above the belt a bank of electrical heating elements with suitable reflectors to project the heat downward onto the dried flakes after passing under the drying lamps. The bank of heating elements is likewise movable on its supports to adjust the distance between the heating elements and the dried flakes so that the heat applied during the fusing step is readily adjustable. Still greater flexibility of operation is attained by making the speed of the belt adjustable, e. g. driving the belt by means of an electric motor operating through a readily adjustable variable speed gear assembly. It is thus possible to control easily the drying temperature, the fusing temperature, and the time of heating, by moving the heating elements closer to or farther away from the belt and by regulating the speed of the belt to obtain the proper degree of fusion of the particles without causing decomposition. The fused particles are cooled by allowing the belt to travel a short distance through the air at room temperature and then passing the belt over a hollow drum through which water or other cooling medium is circulated. The fused lamellar particles, after cooling, are removed from the belt by a revolving brush, a scraper blade, or in other suitable manner and collected in a container.

The following examples illustrate ways of practicing the invention, but are not to be construed as limiting the scope thereof:

Example 1

An aqueous emulsion was prepared by polymerizing 84 pounds of styrene in 116 pounds of water containing 0.84 pound of Victawet 58B (70 per cent paste) as emulsifying agent, 0.294 pound of potassium persulfate as catalyst, and 0.336 pound of sodium bicarbonate ($NaHCO_3$), by heating and agitating the mixture in a closed vessel for 6 hours at 85° C. A weighed sample of the aqueous emulsion was analyzed and found to contain 41 per cent by weight of solids.

The Victawet 58B employed as the emulsifying agent is a sodium salt of a capric acid-phosphoric acid anhydride and apparently has the formula $Na_5R_5(P_3O_{10})_2$ wherein R represents a capryl, i. e. $C_9H_{19}CO$, radical.

A pigment dispersion was prepared by wetting 1.35 pounds of chromium oxide ($Cr_2O_3$) with 1.35 pounds of an aqueous solution containing 3 per cent by weight of methylcellulose (100 c. p. s.) and passing the mixture through a colloid mill. 0.54 pound of Tergitol wetting agent No. 7, an aqueous solution containing 25 per cent by weight of the sodium salt of sulfated 3,9-diethyltridecanol-6, was then added to the pigment mixture and followed by 0.18 pound of Santomerse No. 3, the sodium salt of dodecyl benzene sulfonate, dissolved in 0.42 pound of water.

44 pounds of the above polystyrene emulsion containing 41 per cent solids was gradually added to the pigment dispersion and blended to a homogeneous composition.

The aqueous pigmented composition was sprayed onto a continuous stainless steel belt 10 inches wide and 45 feet long in a layer having a thickness of 5 to 8 mils. The aqueous layer on the moving belt passed under a bank of infrared lamps supported at a distance of about 4 inches from the surface. On drying the slurry cracked into small flakes which retained their identity, but were easily crushed to a powder when removed from the belt. After passing under the drying lamps the belt carrying the dry flakes immediately passed under a bank of 1050 watt electric furnace heating cores, supported a short distance above the belt, to fuse the dried flakes. The fusing temperature, as measured by a thermometer placed adjacent to the surface of the moving belt, was from 190° to 200° C. On fusing, the dried flakes coalesced to form lamellar particles that were resistant to powdering and disintegration. The fused particles were cooled by passing the belt through air at room temperature for a short distance and then over a water cooled drum. The lamellar particles were removed from the belt by a revolving brush placed so as to contact the surface of the belt after it has passed over approximately one-fourth of the diameter of the drum and were collected in a container. The product consisted of green lamellar particles having an irregular shape and a thickness of from 2 to 3 mils. By similar procedure laminae having a red color were prepared by using ferric oxide ($Fe_2O_3$) as the pigment.

Example 2

A portion of the pigmented composition prepared in Example 1 was cast onto a flat plate in a layer having a thickness of 120 mils. The coating was dried in an air oven at 90° C. for 16 hours. The dried flakes were of irregular shape and had a thickness of 70 to 80 mils. They were resistant to powdering and were suitable as molding powder.

Example 3

200 grams of a polystyrene emulsion obtained by procedure similar to that described in Example 1 and containing 40 per cent by weight of solids was blended with a pigment dispersion consisting of 6.0 grams of chromium oxide ($Cr_2O_3$), 1.6 grams of an aqueous solution containing 10 per cent by weight of Cellosize WS (hydroxyethylcellulose, 100 c. p. s.) and 1.6 grams of Santomerse No. 3. The aqueous pigmented composition was cast onto a chrome plated steel plate and dried in an oven at 90°–100° C. On drying of the coating the residue cracked to form individual thin powdery flakes. The plate was removed from the oven and the powdery flakes fused by heating the metal plate over a gas flame. Fusing of the powdery flakes was easily determined by observing the color change from dull opaque to a glossy green color. The product consisted of small lamellar particles having an irregular shape.

*Example 4*

70 parts by weight of polystyrene emulsion obtained by similar procedure to that described in Example 1 and containing 42 per cent solids was mixed wtih 30 parts of a synthetic latex obtained by heating 60 parts of styrene and 40 parts of butadiene in the presence of 138 parts of water containing 1 part of sodium lauryl sulfate as emulsifying agent and a peroxygen catalyst until polymerization was complete. The mixed emulsion contained 42 per cent by weight of solids.

To a pigment dispersion consisting of 7.5 grams of cadmium red, 7.5 grams of Cadmium Orange (CdS), 35.0 grams of an aqueous solution containing 4 per cent by weight methylcellulose (100 c. p. s.), 10 grams of Santomerse No. 3, and 7.5 grams of a mixture prepared by heating on a water bath with stirring, 40 grams of butyl stearate, 2.5 grams of stearic acid, 0.9 gram of isopropanol amine and 56.6 grams of water, there was added 930 grams of the mixed emulsion and the mixture blended to form a pigmented composition. A layer of the aqueous composition was cast onto a flat metal plate and dried overnight in an oven at 75° C. The residue consisted of individual powdery flakes. The flakes were fused by heating the metal plate over a gas flame. The product consisted of lamellar particles having an irregular shape and an orange-red color.

Other modes of applying the principle of my invention may be employed instead of those explained, change being made as regards the method or products herein disclosed, provided the steps or products stated in any of the following claims or the equivalent of such stated steps or products be employed.

I therefore particularly point out and distinctly claim as my invention:

1. A process for making lamellar polystyrene particles from an aqueous colloidal polystyrene solution obtained by polymerizing styrene in aqueous emulsion which comprises, drying a layer of the aqueous emulsion by heating the same to a temperature below the fusion temperature of the polystyrene to provide a residue consisting of individual powdery flakes, heating the powdery flakes to a temperature sufficient to fuse the same and form lamellar particles and cooling the fused particles.

2. A process for making laminae comprising pigmented polystyrene from an aqueous colloidal polystyrene solution obtained by polymerizing styrene in aqueous emulsion, which process comprises adding from 0.02 to 10 per cent by weight of a water-soluble thickening agent to the emulsion, dispersing a pigment in the thickened emulsion, drying a layer of the pigmented emulsion by heating the same to a temperature below the fusion temperature of the polystyrene to provide a residue consisting of individual powdery flakes, heating the powdery flakes to a temperature sufficient to fuse the same and form lamellar particles and cooling the fused particles.

3. In a process of making polystyrene laminae, the improvement which comprises drying a layer of an aqueous colloidal polystyrene solution obtained by polymerizing styrene in aqueous emulsion, by heating the same to a temperature below the fusion temperature of the polystyrene to obtain a residue consisting of individual powdery flakes, heating the powdery flakes to a temperature between 170° C. and 200° C. to fuse the individual flakes and cooling the resultant fused lamellar particles.

4. A process for producing laminae of a thermoplastic synthetic resin from an aqueous colloidal solution obtained by polymerizing in aqueous emulsion styrene in admixture with other polymerizable vinylidene compounds wherein the styrene is present in amount corresponding to at least 85 per cent by weight of the polymerizable monomeric compounds which process comprises the steps of adding to the aqueous colloidal solution from 0.02 to 10 per cent by weight of a water-soluble thickening agent, drying a layer of the aqueous dispersion by heating the same to a temperature below the fusion temperature of the resin to provide a residue consisting of individual powdery flakes, heating the powdery flakes to a temperature between 170° C. and 200° C. for a time sufficient to fuse the thermoplastic particles in the powdery flakes and form lamellar particles, and cooling the fused particles.

5. A process for producing lamellar polystyrene particles from an aqueous colloidal polystyrene solution obtained by polymerizing styrene in aqueous emulsion which process comprises adding from 0.02 to 10 per cent of methylcellulose to the emulsion, drying a layer of the emulsion by heating the same to a temperature between 75° and 100° C., to obtain a residue consisting of individual powdery flakes, heating the powdery flakes to a temperature between 170° C. and 200° C. to fuse the same and form lamellar particles and cooling the fused particles.

6. A process for producing lamellar polystyrene particles from an aqueous collidal polystyrene solution obtained by polymerizing styrene in aqueous emulsion which comprises adding from 0.02 to 10 per cent of a water-soluble thickening agent to the emulsion, drying a layer of the emulsion by heating the same to a temperature below the fusion temperature of the polystyrene to form individual powdery flakes, heating the powdery flakes to a temperature sufficient to fuse the particles in the individual flakes and form lamellar particles and cooling the latter.

7. In a process for making pigmented lamellar particles of a thermoplastic resin, comprising at least 85 per cent by weight of chemically combined styrene, from an aqueous dispersion of the resin in colloidal form, the steps of dispersing a pigment in the aqueous mixture, applying a layer of the resultant mixture to a metal surface, drying the aqueous layer by heating the same to a temperature below the fusion temperature of the resin to obtain a residue consisting of individual powdery flakes, heating the powdery flakes while remaining on the metal surface to a temperature sufficient to fuse the thermoplastic resinous particles in the individual flakes and form lamellar particles, cooling the fused particles and thereafter removing the fused particles from the metal surface.

8. A process for making pigmental laminae of polystyrene from an aqueous colloidal polystyrene solution obtained by polymerizing styrene in aqueous emulsion which comprises dispersing a pigment in said colloidal solution, applying a layer of the aqueous dispersion to a metal surface, drying the aqueous layer by heating the same to a temperature below the fusion temperature of the polystyrene to obtain powdery flakes which retain their identity, heating the powdery flakes to a temperature sufficient to fuse the polystyrene particles in the individual powdery flakes and form lamellar particles, cooling the fused particles and thereafter removing the latter from the metal surface.

9. A process for making polystyrene laminae from an aqueous colloidal polystyrene solution obtained by polymerizing styrene in aqueous emulsion which comprises adding from 0.02 to 10 per cent by weight of a water-soluble thickening agent to the emulsion, applying a layer of the resultant composition to a metal surface, drying the aqueous layer by heating the same to a temperature between 75° and 100° C. to obtain powdery flakes which retain their identity, heating the dry powdery flakes while remaining on the metal surface to a temperature between 170° C. and 200° C. to fuse the individual powdery flakes and form lamellar particles, cooling the fused particles and thereafter removing the latter from the metal surface.

10. A process for making pigmented polystyrene laminae from an aqueous colloidal polystyrene solution which comprises dispersing a pigment in said solution, applying a layer of the aqueous pigmented dispersion to a metal surface, drying the aqueous layer by heating the same to a temperature below the fusion temperature of the polystyrene to obtain a residue consisting of individual powdery flakes comprising polystyrene particles and pigment, heating the powdery flakes to a temperature sufficient to fuse the polystyrene particles in the individual flakes and form lamellar particles, cooling the fused particles, and thereafter removing the latter from the metal surface.

LAURENCE L. RYDEN.

REFERENCES CITED

The following references are of record in the file of this patent:

UNITED STATES PATENTS

| Number | Name | Date |
| --- | --- | --- |
| 2,270,182 | Collings et al. | Jan. 13, 1942 |
| 2,283,539 | Collings et al. | May 19, 1942 |

FOREIGN PATENTS

| Number | Country | Date |
| --- | --- | --- |
| 437,604 | Great Britain | Oct. 28, 1935 |